United States Patent
Jacobson et al.

(10) Patent No.: US 6,192,436 B1
(45) Date of Patent: Feb. 20, 2001

(54) SYSTEM AND METHOD FOR CONFIGURATION OF ELECTRONIC DEVICES USING A SMART CARD WHICH HAVING CONFIGURATION DATA STORED THEREIN

(75) Inventors: Neil G. Jacobson, Mountain View; Matthew T. Murphy, San Jose, both of CA (US)

(73) Assignee: Xilinx Inc., San Jose, CA (US)

( * ) Notice: Under 35 U.S.C. 154(b), the term of this patent shall be extended for 0 days.

(21) Appl. No.: 09/156,708

(22) Filed: Sep. 18, 1998

(51) Int. Cl.[7] ........................................ G06F 13/14
(52) U.S. Cl. ........................ 710/104; 710/8; 710/63; 710/102; 710/105; 713/100
(58) Field of Search ................ 710/11, 13, 63, 710/64, 102, 105, 68, 8, 104, 129; 703/24, 21, 25; 711/102, 104, 115; 713/2, 100

(56) References Cited

U.S. PATENT DOCUMENTS

| | | | |
|---|---|---|---|
| 5,613,092 | * | 3/1997 | Lim et al. ............................ 710/102 |
| 5,651,116 | * | 7/1997 | Le Roux ............................... 710/11 |
| 5,819,050 | * | 10/1998 | Boehling et al. ................... 710/104 |
| 5,835,864 | * | 11/1998 | Diehl et al. .......................... 455/602 |
| 5,867,795 | * | 2/1999 | Novis et al. ......................... 455/566 |
| 5,875,415 | * | 2/1999 | Lieb et al. ........................... 702/122 |
| 5,938,750 | * | 8/1999 | shaberman .......................... 710/102 |
| 5,954,808 | * | 9/1999 | Paul ..................................... 710/104 |
| 6,014,748 | * | 1/2000 | Tushie et al. ....................... 713/200 |
| 6,032,135 | * | 2/2000 | Molano et al. ....................... 705/41 |

OTHER PUBLICATIONS

Dr. David B. Everett, "Smart Card Technology: Introduction to Smart Cards", Copyright 1997, Smart Card News Ltd., Brighton, England, pp. 1–4.

Philips Semiconductors Data Sheet, TDA8000; TDA800T Smart card interface, Dec. 12, 1996, pp. 1–23.

* cited by examiner

Primary Examiner—Thomas C. Lee
Assistant Examiner—Thuan Du
(74) Attorney, Agent, or Firm—LeRoy D. Maunu; Jeanette S. Harms

(57) ABSTRACT

A system and method for configuration of electronic devices using a smart card. A smart card configurable and testable system includes a programmable device, a bridge coupled to the programmable device, and a smart card interface coupled to the bridge. The bridge is configured and arranged to format configuration data from the smart card for transmission to the programmable device, and the smart card interface arrangement is configured and arranged to provide configuration data from the smart card to the bridge.

21 Claims, 5 Drawing Sheets

SYSTEM AND METHOD FOR CONFIGURATION OF ELECTRONIC DEVICES USING A SMART CARD WHICH HAVING CONFIGURATION DATA STORED THEREIN

FIELD OF THE INVENTION

The present invention generally relates to programming, configuring, and/or testing electronic devices, and more particularly to programming and/or configuring devices using a smart card.

BACKGROUND OF THE INVENTION

Electronic systems today may include one or more devices such as Complex Programmable Logic Devices (CPLDs), Field Programmable Gate Arrays (FPGAs), Programmable Read-Only Memories (PROMs), and Application Specific Integrated Circuits (ASICs). These devices are configured and/or programmed to fulfill the system requirements.

One technique for configuring such devices is to individually program the devices on conventional parallel programmers and then attach the devices to a system circuit board. This approach involves significant handling of devices which may result in damage. Specifically, device pins may be bent during insertion and removal from a programmer, thereby rendering the device useless. Another disadvantage with programmers is that upgrading devices at user sites may not be practicable because of the size and expense of programmers.

An alternative technique for configuring devices is in-system programming. This approach involves attaching devices to a system circuit board prior to the devices having been programmed. Once attached, the system voltage levels are used to program the devices. This approach solves the problems associated with parallel programmers in that the devices need not be handled both for programming and for attaching to the system board. In addition, with sufficient communication interface circuitry, the devices can be reprogrammed at a user site via personal computers or phone lines, for example. A disadvantage to this approach, however, is that the interface can be cost prohibitive.

A system and method that addresses the aforementioned problems, as well as other related problems, are therefore desirable.

SUMMARY OF THE INVENTION

In accordance with the present invention, a smart card is provided in a programmable electronic system. In one embodiment, the system comprises a configurable electronic device and a- bridge coupled to the configurable device. The bridge is configured and arranged to format configuration data from the smart card for transmission to the configurable device. A smart card interface arrangement is coupled to the bridge and is configured and arranged to provide configuration data from the smart card to the bridge.

A method for configuring an electronic device is provided in another embodiment. The method comprises storing selected configuration data on a smart card, reading the configuration data from the smart card, translating the configuration data to a selected format compatible with a configuration interface for the device, and downloading configuration data in the selected format to the device.

In another embodiment, an apparatus is provided for configuring an electronic device with configuration data from a smart card. The apparatus comprises means for reading the configuration data from the smart card, means for translating the configuration data to a selected format compatible with a configuration interface for the device, and means for downloading configuration data in the selected format to the device.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the following detailed description and upon reference to the drawings in which.

DETAILED DESCRIPTION OF THE DRAWINGS

The present invention is believed to be applicable to a variety of configurable electronic systems. Such configurable electronic systems include, for example, mobile telephones, set-top boxes, computer systems and others as will be recognized by those skilled in the art. The present invention has been found to be particularly applicable and beneficial in electronic systems having programmable logic devices, such as complex programmable logic devices (CPLDs), field programmable gate arrays (FPGAs), programmable read-only memories (PROMs), as well as some application specific integrated circuits (ASICs). While the present invention is not so limited, an appreciation of the present invention is presented by way of a particular example application, in this instance, in the context of an example electronic system that includes a plurality of configurable devices.

Figure 1:
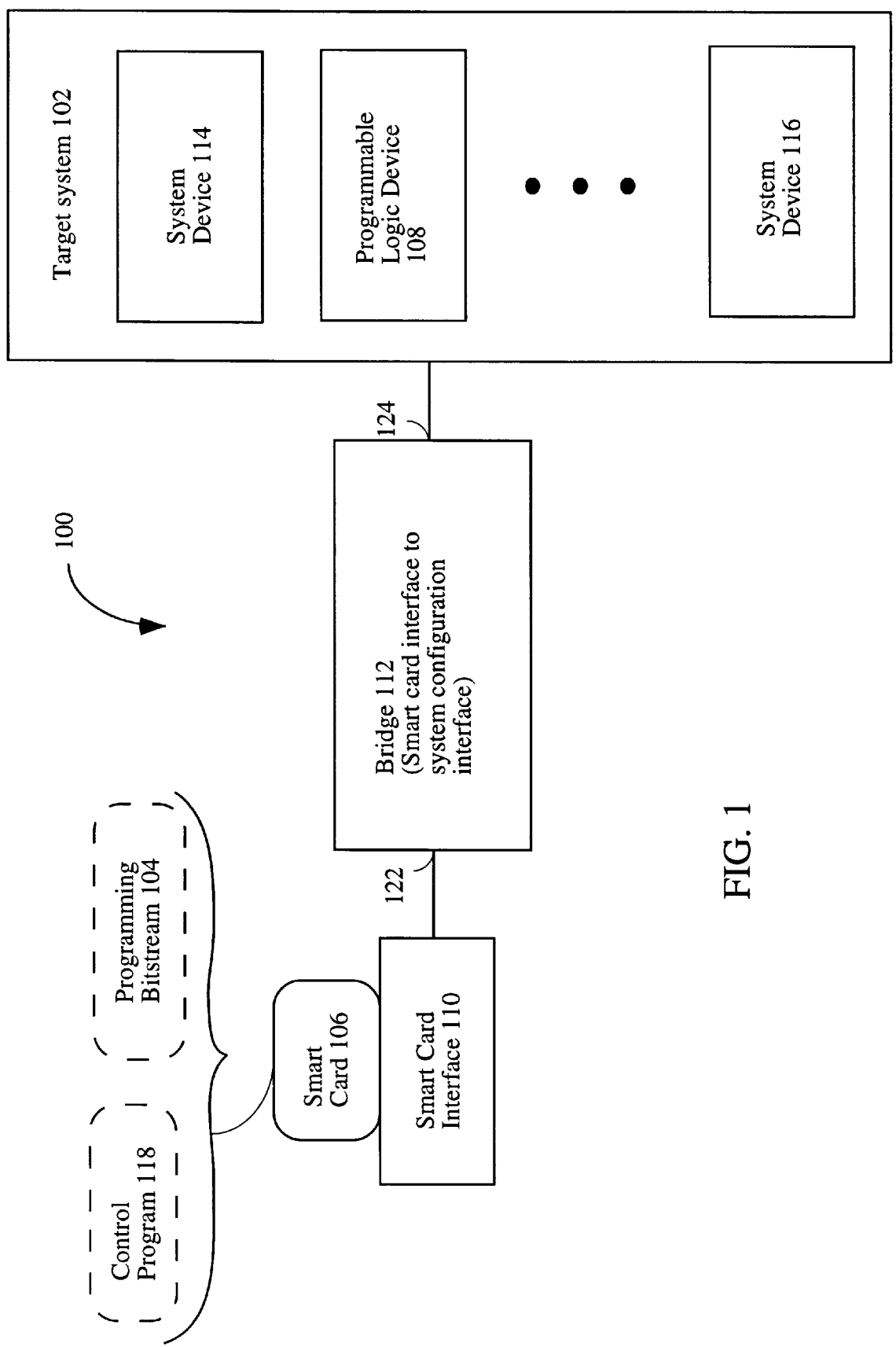
FIG. 1 is a block diagram of an example arrangement for configuring a target electronic system.

FIG. 1 is a block diagram of an example arrangement 100 for configuring a target electronic system 102. Specifically, the arrangement 100 illustrates, according to an example embodiment, a programming bitstream 104 that is stored on a smart card 106 and downloaded from the smart card to a programmable logic device 108 on the target system 102. While the example arrangement 102 is described in terms of a programming bitstream 104 for a programmable logic device 108, it will be appreciated that the concept can be generalized to support downloading of configuration bitstreams (generally referred to herein as "configuration data") to other types of configurable devices, such as a PROMS and configurable ASICs.

The arrangement 100 also includes a smart card interface 110 and a bridge 112 that provides an interface between the smart card interface 110 and the target system 102. Along with programmable logic device 108, the target system 102 includes additional system devices 114 and 116. The smart card interface 110 includes a conventional physical socket for insertion of a smart card and circuitry for receiving data from and sending data to the smart card 106.

The smart card 106 is configured with a control program 118 and a programming bitstream 104 in the example arrangement. When the smart card 106 is inserted in the interface 110, the control program 118 is executed in the microprocessor (not shown) of the smart card 106. The control program 118 in the example embodiment, reads the programming bitstream 104 from the memory (not shown) of the smart card 106 and provides the bitstream at the output port (not shown) of the smart card 106. It will be appreciated that other programs could be constructed to perform additional functions, such as receiving test data from devices 108, 114, and 116 of the target system 102.

Smart cards are available in different sizes and with different circuitry. Some smart cards have metal contacts while others do not. Some smart cards have a CPU, while others have specially adapted microcontrollers, and still others have special control circuitry. Memory types also vary between different types of smart cards and include ROM, RAM, PROM, EPROM, and EEPRC)M. It will be appreciated that the present invention is not limited to any one type of smart card, and that the different types of smart cards could be arranged to function in accordance with the present invention.

The bridge can be implemented, for example, as a microprocessor-based arrangement with software control, or as a hardware-based arrangement with no software control. The characteristics of the smart card interface port, the system configuration interface port 124, and the logic for bridging the two ports are dependent upon the particular protocols used by the smart card interface 110 and the system configuration interface. In an example embodiment, the smart card interface 110 is compliant with ISO standard 7816, and the system configuration interface is compliant with IEEE standard 1149.1. The TDA8000 family of integrated circuits from Philips Semiconductors exemplify such a smart card interface, and the SW74ABT8990 products from Texas Instruments exemplify such an IEEE 1149.1 interface. Those skilled in the art will appreciate that other smart card interface and system configuration interface protocols, and suitable combinations thereof, could be used in accordance with the present invention. For example, a dedicated processor with associated memory and coded software algorithms could be used for the smart card interface, and a similar hardware configuration could be used for the system configuration interface.

Figure 2:
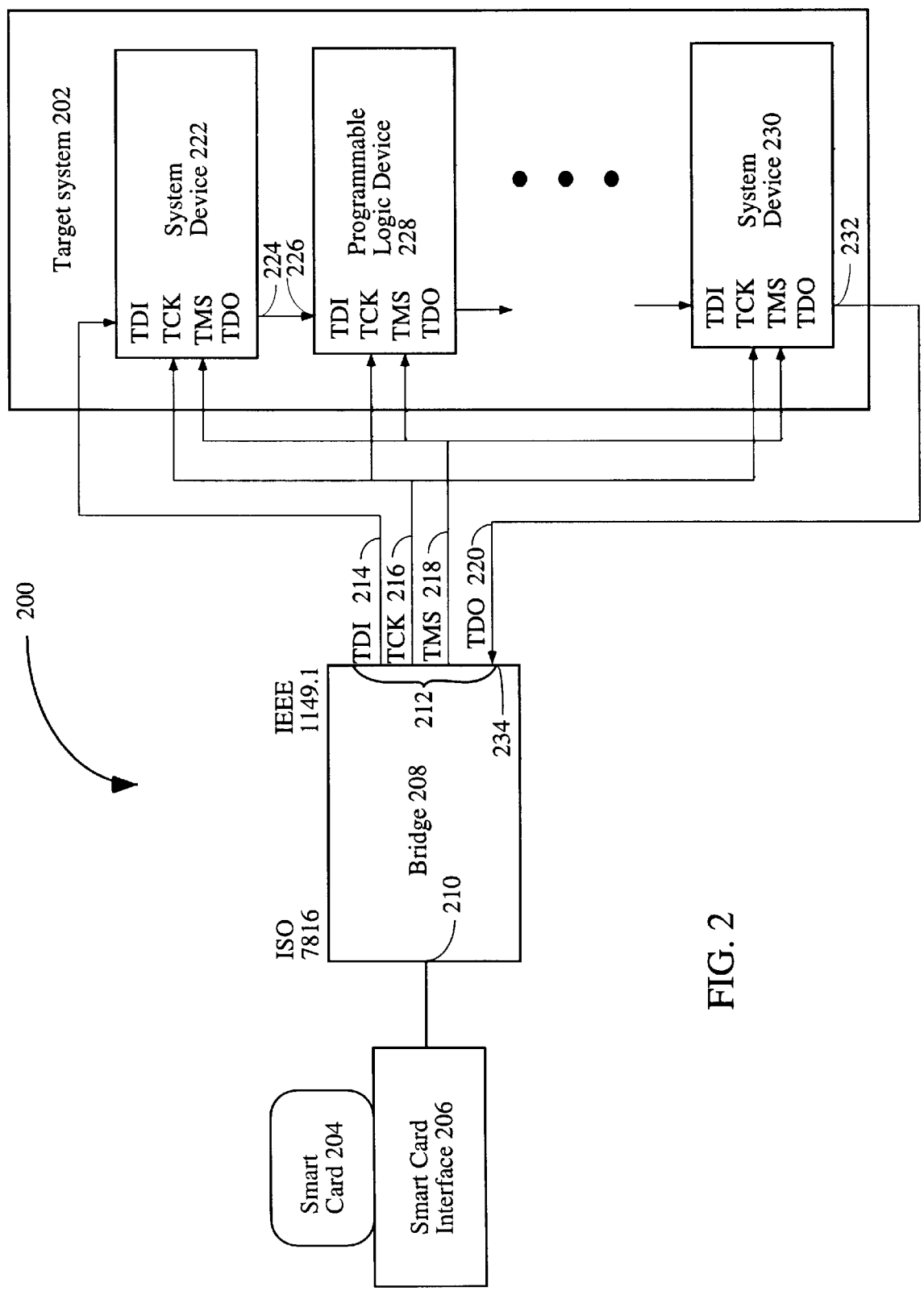
FIG. 2 is a block diagram of an arrangement for configuring a target system using a smart card according to an example embodiment of the invention.

Turning now to FIG. 2, a block diagram of an arrangement 200 for configuring a target system 202 using a smart card 204 according to an example embodiment of the invention is shown. The smart card 204 and smart card interface 206 are compliant with ISO standard 7816, and bridge 208 includes an ISO standard 7816 port 210. On the system configuration side of bridge 208, the system configuration interface port 212 is compliant with IEEE standard 1149.1 and is coupled to test data input (TDI), test clock (TCK), test mode select (TMS), and test data output (TDO) signal lines 214, 216, 218, and 220, respectively.

The TDI line 214 is coupled to system device 222, which may be a CPLD, PROM, or configurable ASIC, for example. The TL)O port 224 of system device 222 is coupled to the TDI port 226 of the programmable logic device 228. This type of connection continues to device 230. The TDO port 232 is coupled to the TDO port: 234 of the bridge 208. Each of the devices 222, 228, and 230 include an 1149.1 interface as indicated by the respective TDI, TCK, TMS, and TDO ports.

The system configuration interface portion of bridge 208 supplies a TCK signal on line 216 to TCK ports of the devices 222, 228, and 230 of system 202. Similarly, a TMS signal is provided on line 218 to the TMS ports of devices 222, 228, and 230.

Figure 3:
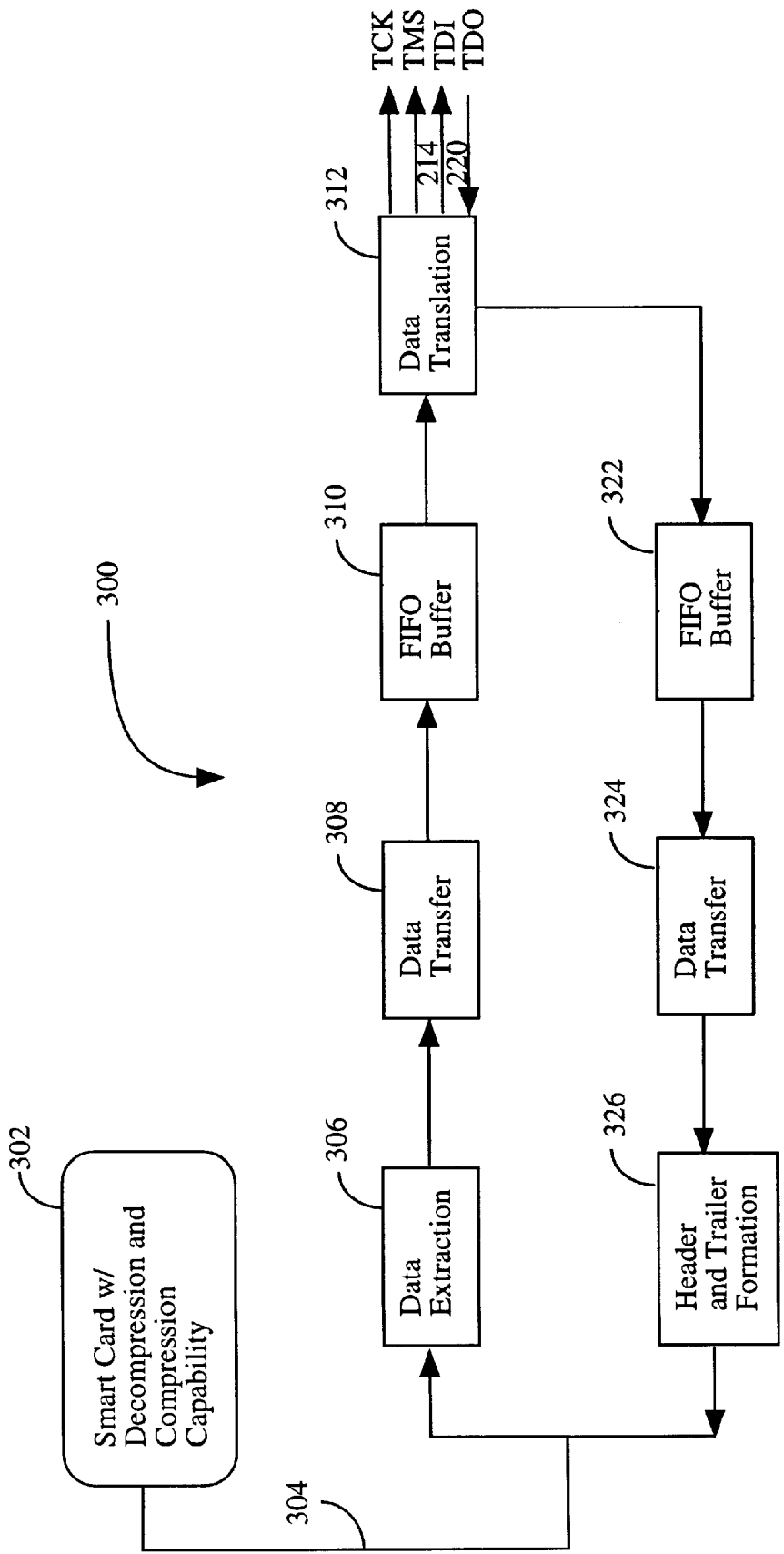
FIG. 3 is a block diagram of a bridge arrangement coupled to a smart card according to an example embodiment of the invention.

FIG. 3 is a block diagram of a bridge arrangement 300 coupled to a smart card 302 according to an example embodiment of the invention. Dashed line 304 represents the coupling of the smart card 302 to the bridge arrangement 300 via a smart card interface 206, for example. While not shown, it will be appreciated that the smart card 302 includes configuration data or a programming bitstream and optional test data, for example. Because such configuration data and programming bitstreams may be very large in terms of numbers of bits, perhaps exceeding the available memory on the smart card 302, it may be necessary to compress the configuration data prior to storage on the smart card. FIG. 3 illustrates an embodiment in which the smart card 302 is configured, either with software or hardware, to decompress data prior to downloading the data to the bridge arrangement 300. In addition, the logic compresses data provided by the bridge arrangement 300 for storage in the smart card 302. Compression standards such as Lempel-Ziv, history-based algorithms, and run-length encoding are suitable alternatives for such processing.

Configuration data from the smart card 302 is received by the data extraction unit 306 of the bridge arrangement in ISO standard 7816 format, for example. The data extraction unit removes from a packet of configuration data the header and trailer bits that are part of the ISO 7816 format. The configuration data is then provided to the data transfer unit 308, which writes the configuration data to the FIFO buffer in units that are compatible with the FIFO buffer 310. FIFO buffer 310 is used to buffer data between the two protocols, ISO 7816 and IEEE 1149.1, for example, where the packet size and data transfer rate of ISO 7816 is different from IEEE 1149.1. Based on the space available in the FIFO buffer 310, the data transfer unit 308 signals the data extraction unit 306 when more data can be downloaded from the smart card 302. The data translation unit 312 monitors the amount of available data in the FIFO buffer 310, and when there is sufficient data to burst a bitstream over TDI line 214, the data translation unit 312 reads data from the FIFO for transmission.

In one example embodiment, the configuration data, as read from the FIFO buffer 310 by the data translation unit 312, can be formatted as three-bit groups, as illustrated below:

[data] |$TMS_1$|$TDI_1$|$TDO_1$|
|$TMS_2$|$TDI_2$|$TDO_2$|
. . .
|$TMS_n$|$TDI_n$|$TDO_n$|
[wait] [microseconds]

Each group of three bits includes a TMS bit, a TDI bit:, and a TDO bit. A "[data]" indicator precedes a sequence of groups of bits to indicate to the data translation unit 312 that configuration data follow. A "[wait]" instruction and a "[microseconds]" parameter are included along with the configuration data to indicate to the data translation unit 312 to wait for the prescribed period of time after bursting the preceding sequence of configuration data to the target system 202. It will be appreciated that the duration of the waiting period is dependent upon the target system 202.

In another example embodiment, the configuration data, as read from the FIFO buffer 310 by the data translation unit 312, can be formatted as illustrated below:

[instr] |TDI$_1$|TDI$_2$|TDI$_3$|. . . |TDI$_n$|TDO$_1$|TDO$_2$|TDO$_3$|. . . |TDO$_n$|

[data] |TDI$_1$|TDI$_2$|TDI$_3$|. . . |TDI$_n$|TDO$_1$|TDO$_2$|TDO$_3$|. . . |TDO$_n$|

[wait] [microseconds]

. . .

The format above does not include TMS bits. In this embodiment, the data translation unit 312 generates the appropriate TMS sequences based on the "[instr]", "[data]", and "[wait]" indicators. The "[instr]" indicator signals to the data translation unit 312 that the TDI bits that follow are to be loaded as IEEE 1149.1 instructions in a device 222, 228, or 230 of the target system 202. The "[data]" indicator signals to the data translation unit 312 that the TDI bits that follow are to be loaded as data in one of the devices 222, 228, or 230. The "[wait]" indicator functions as described above.

Data may be returned from the devices 222, 228, and 230 of the target system to the data translation unit 312 on the TDO signal line 220. The output signals may be for the purpose of branching and executing a test program stored on the smart card 302 or for test verification. Output data is collected by the data translation unit 312 and written to the FIFO buffer 322. When the FIFO buffer 322 contains enough output data, the data transfer unit 324 reads the data from the FIFO buffer and transfers the data to the header and trailer formation unit 326. An ISO 7816 compatible packet is formed by the header and trailer formation unit 326 and transmitted to the smart card 302.

The use of TDO in the data is optional. In some cases, the data returned by the device is relevant to a test sequence, for example. In such implementations, the expected TDO values are specified in the data files. When data are output from a device to the data translation unit 312, the expected TDO data are compared to the TDO returned on line 220. The results of the comparison are returned to the smart card 302 for further processing.

Figure 4:
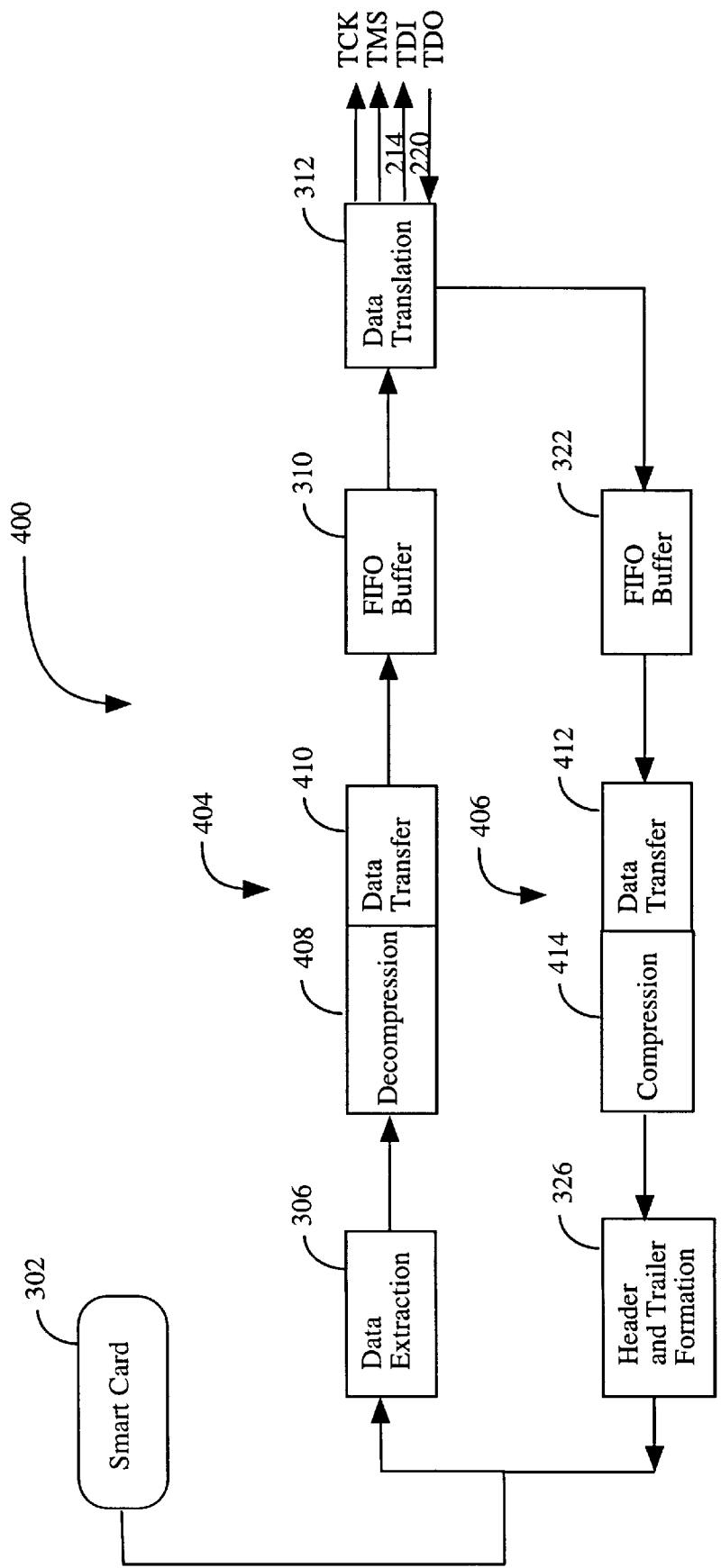
FIG. 4 is a block diagram of a bridge arrangement coupled to a smart card according to another example embodiment of the invention.

FIG. 4 is a block diagram of a bridge arrangement 400 coupled to a smart card 402 according to another example embodiment of the invention. The embodiment of FIG. 4 as compared to the embodiment of FIG. 3 includes compression and decompression logic in the bridge arrangement 400 rather than in the smart card 402. Apart from the decompression/data transfer unit 404 and the compression/data transfer unit 406, the other units in the bridge arrangement 400 are the same as the units of FIG. 3.

The decompression unit 408 receives configuration data from the data extraction unit 306 and decompresses it for data transfer unit 410. The data transfer unit 410 writes the data to the FIFO buffer 310 as described above in FIG. 3. The data transfer unit 412 reads output data from the FIFO buffer 322 for compression by compression unit 414. The compressed data is provided by compression unit 414 to header and trailer formation unit :326.

Figure 5:
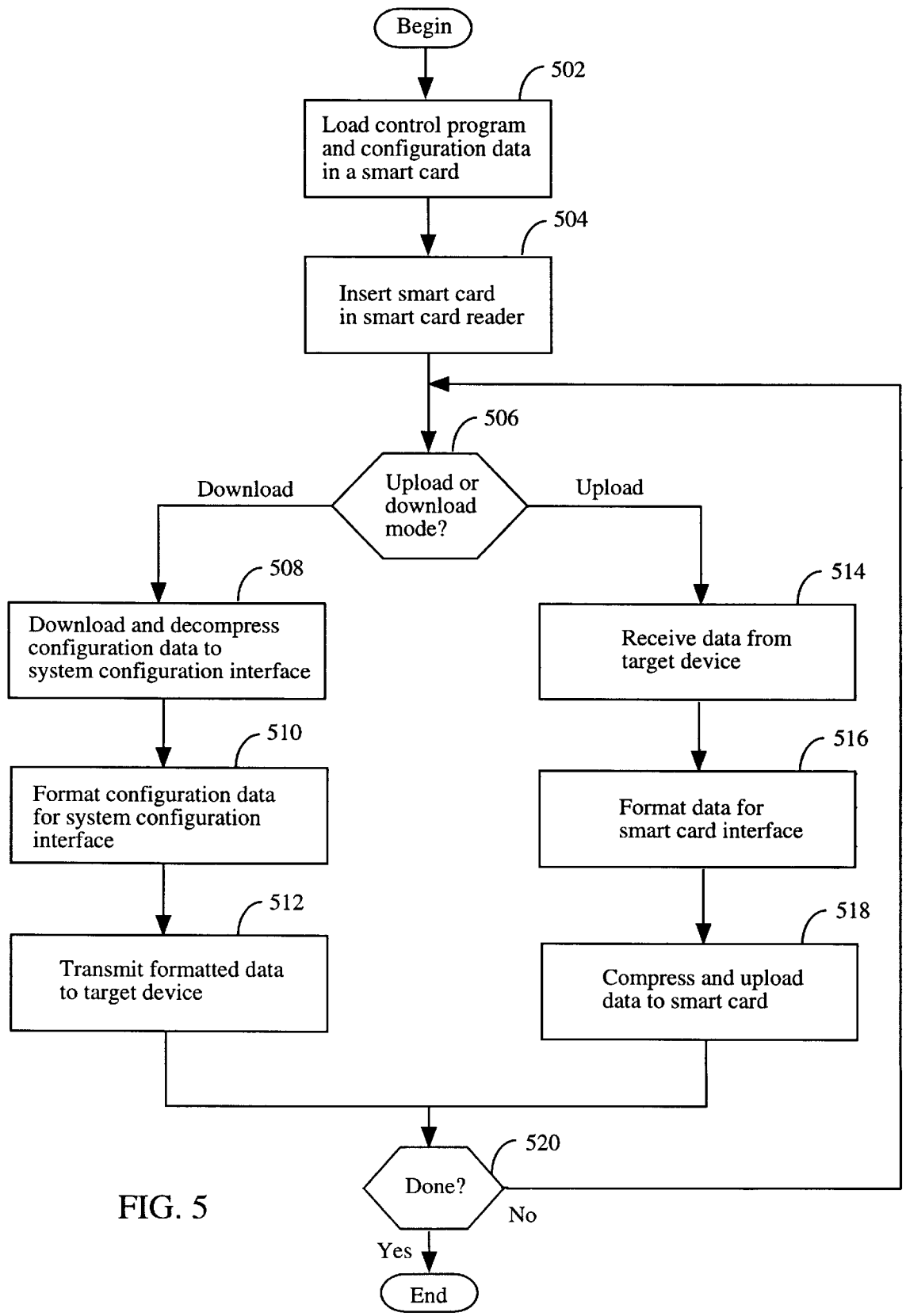
FIG. 5 is a flowchart of a method for using a smart card to configure electronic devices.

FIG. 5 is a flowchart of a method for using a smart card to configure electronic devices, such as CPLDs, FPGAs, PROMs, and configurable ASICs. At block 502 a control program and configuration data are loaded into a smart card. A conventional smart card programmer can be used to configure the smart card. The control program and configuration data are as described above relative to FIG. 1. To configure electronic devices of a target system, the smart card is inserted in a smart card reader as indicated by block 504.

The smart card is operable in either download or upload modes of operation. In download mode, decision block 506 directs control to block 508, where configuration data on the smart card is read by a smart card reader and provided to a bridge unit. As indicated previously, the configuration data on the smart card may be compressed, and the decompression of the data may be performed either by the smart card, the bridge, or a combination thereof. The bridge unit accepts data provided in smart card format and translates the data according to configuration interface requirements for the target system, as shown by block 510. At block 512, the configuration data is transmitted to the target device on the target system.

In upload mode, decision block 506 directs control to block 514. Data that is output from a target device is received by a system configuration interface of a bridge at block 514. The data is appropriately formatted for a smart card at block 516. The data is then compressed, if necessary, and uploaded to the smart card at block 518. As noted above, the compression of data may be performed in whole or in part by the smart card instead of the bridge. Processing continues until the control program finds that selected conditions have been satisfied (block 520), such as all configuration data has been downloaded or a test is complete.

Accordingly, the present invention provides, among other aspects, a method and system for configuring electronic devices using a smart card. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A smart card programmable electronic system, comprising:

a programmable logic device;

a smart card having a processor and a memory, wherein the memory is configured with configuration data for programming logic of the programmable logic device and a control program executable on the processor to output the configuration data;

a bridge coupled to the programmable logic device, and configured and arranged to format configuration data from the smart card for transmission to the programmable logic device; and a smart card interface arrangement coupled to the smart card and to the bridge, and configured and arranged to provide configuration data from the smart card to the bridge.

2. The system of claim 1, wherein the programmable logic device includes one of a field programmable gate array and a complex programmable logic device.

3. The system of claim 1, wherein the smart card is ISO 7816 compliant.

4. The system of claim 3, wherein the bridge is compliant with IEEE standard 1149.1.

5. The system of claim 1, wherein the bridge is compliant with IEEE standard 1149.1.

6. The system of claim 1, wherein the bridge is configured and arranged to format data output from the programmable logic device for transmission to the smart card interface arrangement.

7. The system of claim 1, wherein the bridge includes:

a data extraction arrangement coupled to the bridge;

a decompression arrangement coupled to the data extraction arrangement;

a first FIFO buffer coupled to the decompression arrangement; and a data translator coupled to the FIFO buffer and arranged to format configuration data from the first FIFO for transmission to the programmable logic device.

8. The system of claim 7, wherein the bridge further includes:

a second FIFO buffer coupled to the data translator;

a compression arrangement coupled to the second FIFO buffer;

a data formatter coupled to the compression arrangement; and wherein the data translator is further arranged to extract data output from the programmable logic device for transmission to the smart card.

9. The system of claim 7, wherein the smart card is ISO 7816 compliant.

10. The system of claim 9, wherein the bridge is compliant with IEEE standard 1149.1.

11. The system of claim 7, wherein the bridge is compliant with IEEE standard 1149.1.

12. The system of claim 1, wherein the control program arranged to decompress the configuration data prior to output.

13. The system of claim 12, wherein the control program is arranged to compress data received from the programmable logic device.

14. A method for configuring a programmable logic device, comprising:

storing selected configuration data on a smart card, the configuration data being adapted for programming logic of the programmable logic device;

reading the configuration data from the smart card;

translating the configuration data to a selected format compatible with a configuration interface for the programmable logic device; and downloading the translated configuration data in the selected format to the programmable logic device.

15. The method of claim 14, wherein the programmable logic device is one of a field programmable gate array and a complex programmable logic device.

16. The method of claim 14, wherein the smart card is ISO 7816 compliant.

17. The method of claim 16, wherein the selected format is compliant with IEEE standard 1149.1.

18. The method of claim 14, wherein the selected format is compliant with IEEE standard 1149.1.

19. The method of claim 14, further comprising:

translating output signals from the programmable logic device to data signals of a selected smart card format; and transmitting the data signals to the smart card.

20. The method of claim 14, further comprising:

downloading from the smart card expected result data indicative of expected test results;

comparing the expected result data to output data returned from the device; and transmitting comparison results to the smart card.

21. An apparatus for configuring a programmable logic device with configuration data from a smart card, comprising:

means for reading the configuration data from the smart card, the configuration data being adapted for programming logic of the programmable logic device;

means for translating the configuration data to a selected format compatible with a configuration interface for the programmable logic device; and means for downloading configuration data in the selected format to the programmable logic device.

* * * * *